(12) United States Patent
Graham, Jr. et al.

(10) Patent No.: US 11,208,208 B2
(45) Date of Patent: Dec. 28, 2021

(54) SYSTEMS AND METHODS FOR SYNCHRONIZING EVENTS IN SHIFTED TEMPORAL REFERENCE SYSTEMS

(71) Applicant: Geocue Group, Inc., Madison, AL (US)

(72) Inventors: Lewis N. Graham, Jr., Madison, AL (US); Carl S. Riddell, Madison, AL (US); Derek Morris, Decatur, AL (US)

(73) Assignee: Geocue Group, Inc., Huntsville, AL (US)

( * ) Notice: Subject to any disclaimer, the term of this patent is extended or adjusted under 35 U.S.C. 154(b) by 129 days.

(21) Appl. No.: 16/163,176

(22) Filed: Oct. 17, 2018

(65) Prior Publication Data

US 2019/0135431 A1 May 9, 2019

Related U.S. Application Data

(60) Provisional application No. 62/573,873, filed on Oct. 18, 2017.

(51) Int. Cl.
*B64C 39/02* (2006.01)
*G06F 1/12* (2006.01)
*G05D 1/10* (2006.01)
*G05D 1/00* (2006.01)
*G01S 19/14* (2010.01)
(Continued)

(52) U.S. Cl.
CPC .............. *B64C 39/024* (2013.01); *G01S 1/00* (2013.01); *G01S 5/0027* (2013.01); *G01S 19/14* (2013.01); *G05D 1/0094* (2013.01); *G05D 1/101* (2013.01); *G06F 1/12* (2013.01); *B64C 2201/127* (2013.01); *B64C 2201/145* (2013.01)

(58) Field of Classification Search
CPC ....... B64C 39/024; G01S 1/00; G01S 5/0027; G01S 19/14; G05D 1/0094; G05D 1/101; G06F 1/12
USPC ........................................................... 701/2
See application file for complete search history.

(56) References Cited

U.S. PATENT DOCUMENTS

2005/0165886 A1\* 7/2005 Tuer ................. G08G 1/096725
709/203
2014/0365551 A1\* 12/2014 Mutschler ............... H04L 69/28
709/201

(Continued)

*Primary Examiner* — Yazan A Soofi
(74) *Attorney, Agent, or Firm* — Dennen IP Law, LLC (57) ABSTRACT

A system for synchronizing events has a first subsystem that detects, measures, or generates a first set of events and the first subsystem has a first clock for time-stamping each event detected, measured, or generated by the first subsystem. The system further has a second subsystem that detects, measures, or generates a second set of events and the second subsystem has a second clock not synchronized to the first clock. The second clock is for time-stamping events detected, measured, or generated by the second subsystem. The first set of events is related to the second set of events. The system further has a processor that correlates the first set of events with the second set of events to determine a value indicative of a temporal shift between a time of occurrence of the first set of events and a time of occurrence of the second set of events. Also, the processor temporally matches the first set of events to the second set of events and outputs data indicative of the matching between the first set of events to the second set of events to an output device.

15 Claims, 9 Drawing Sheets

(51) Int. Cl.
    *G01S 1/00* (2006.01)
    *G01S 5/00* (2006.01)

(56) References Cited

U.S. PATENT DOCUMENTS

| | | | |
|---|---|---|---|
| 2016/0200437 A1* | 7/2016 | Ryan | B64C 39/022 |
| | | | 244/99.2 |
| 2017/0096075 A1* | 4/2017 | Henry | B60L 11/1822 |
| 2017/0236024 A1* | 8/2017 | Wang | G06K 9/00201 |
| | | | 382/201 |
| 2019/0238433 A1* | 8/2019 | Speasl | H04L 43/08 |
| 2019/0303807 A1* | 10/2019 | Gueye | G06Q 10/02 |

* cited by examiner

SYSTEMS AND METHODS FOR SYNCHRONIZING EVENTS IN SHIFTED TEMPORAL REFERENCE SYSTEMS

CROSS REFERENCE TO RELATED APPLICATION

This application claims priority to U.S. Provisional Patent Application Ser. No. 62/573,873 and entitled Synchronizing Events in Shifted Temporal Reference Systems filed on Oct. 18, 2017, which is incorporated herein by reference.

BACKGROUND

Oftentimes, a low-end movable platform system, such as an unmanned aerial vehicle (UAV) or a remote piloted vehicle (RPV), comprises a plurality of subsystems that comprise sensors for detecting parameters used in the guidance or operation of the system. Each of the sensors in the subsystems record raw data readings of the event detected. For example, the sensors may detect temperature, position, velocity, or the taking of a photograph.

Typically, each sensor in each subsystem behaves according to a local clock that is isolated from other sensor clocks in the system. In this regard, a sensor may detect the taking of a photograph and record this event in accordance with a clock local to the sensor that detects the taking of a photograph. In the same system, another sensor may detect position of the system and record this event in accordance with another local clock local to the sensor that detect position of the system. In such a system, the time associated with the taking of a photograph and the time associated with position detection are not correlated because each sensor is only using a clock local to the sensor.

High-end systems designed for precision measurement often have a master clock to which all sensor packages integrate. Thus, each sensor in the system can record events at that time provided by the master clock or a clock local to the sensor may be synchronized to the master clock. In these systems, the disparate sensors can then be coordinated in time. For example, one sensor may compute the position of the system at a certain frequency, e.g., 10 times per second. In these systems, each position event can be associated in recordation with a time from the master clock or from the synchronized local clock. Another sensor may be recording, for example, ambient temperature at a certain frequency, e.g., 100 times per second. In these systems, each temperature reading can be associated in recordation with a time from the master clock or from the synchronized local clock. Because both recordings, i.e., position and temperature, have used the same master clock or synchronized local clock, the temperature reading at each position of the system can be determined. Note that interpolation may be needed since the two sensors are recording at different frequencies.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present description discloses a system for synchronizing events in a shifted temporal reference system in accordance with an embodiment of the present disclosure. An exemplary system comprises at least two subsystems of a platform, wherein the platform is stationary or dynamic. Each subsystem operates according to a local clock, and the respective clocks are not synchronized.

A first subsystem detects, generates, or measures data indicative of events over time related to the platform, and each event in the data indicative of the events is time stamped based on the first subsystem's local clock. A second subsystem detects, generates, or measures data indicative of events over time related to the platform, and each event in the data indicative of the event is time stamped based on the subsystem's local clock. Thus, the data detected, generated, or measured by the first and second subsystems are not temporally aligned because the local clocks are not in sync. However, the events detected, generated, or measured by the first subsystem and the events detected, generated, or measured by the second subsystem are related.

The exemplary system of the present disclosure receives the data indicative of the events from the first and second subsystems. If the data from the first subsystem does not represent the same events as the data from the second subsystem, the system may transform either the event data from the first subsystem, the event data from the second subsystem, or both into the same event. The system then correlates the transformed event data from the first subsystem with the event data from the second subsystem to obtain a value indicative of a temporal shift. The value indicative of the temporal shift represents the time difference between the local clock of the first subsystem and the local clock of the second subsystem. Thus, the system can temporally synchronize the event data of the first subsystem with the event data of the second subsystem based upon the value indicative of the temporal shift.

Figure 1:
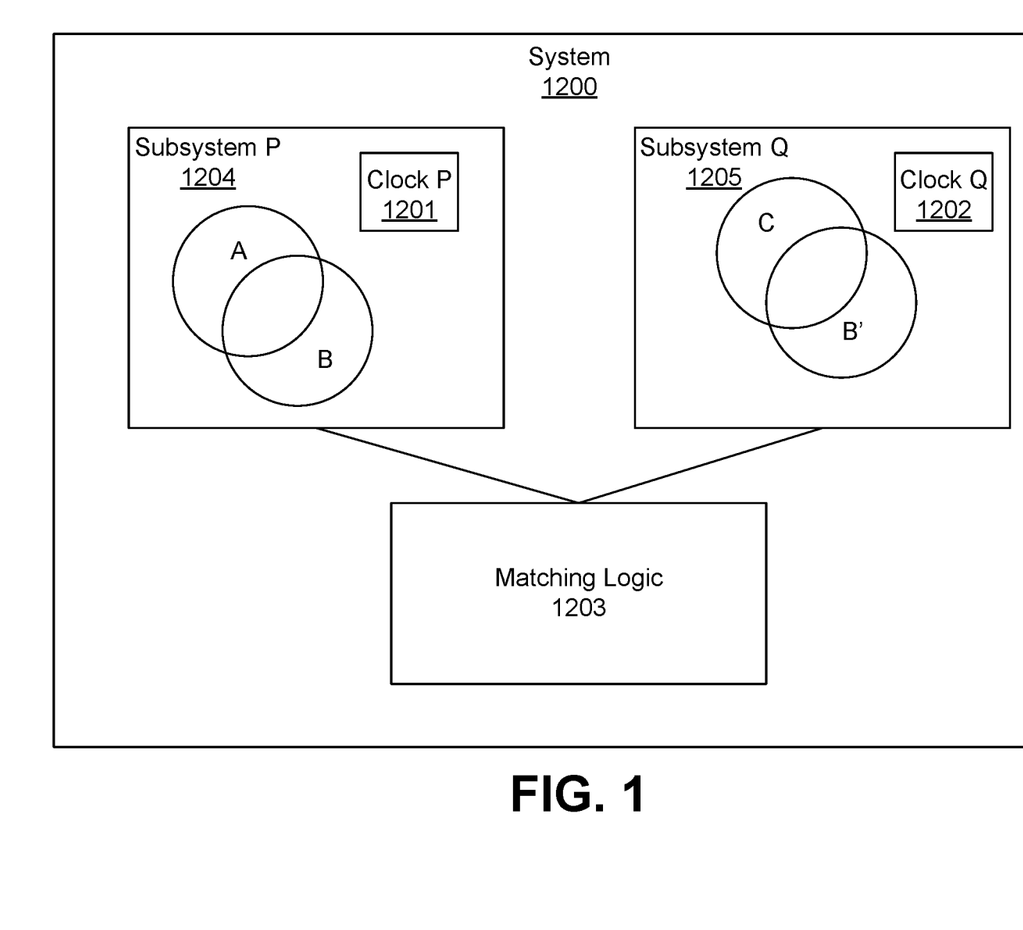
FIG. 1 is a block diagram of a system for synchronizing events in shifted temporal reference systems in accordance with an embodiment of the present disclosure.

FIG. 1 is a block diagram of a system 1200 in accordance with an embodiment of the present disclosure. Note that the system 1200 may be a movable platform; however, in other embodiments, the system 1200 may be stationary. The system 1200 comprises a subsystem P 1204 and a subsystem Q 1205. Further, the system comprises matching logic 1203.

The subsystem P 1204 comprises a clock P 1201, and the subsystem Q 1205 comprises a clock Q 1202. Each of the clocks, clock P 1201 and clock Q 1202, run independent one from the other. Thus, the clock P 1201 and the clock Q 1202 keep separate and distinct times.

In operation of system 1200, subsystem P 1204 detects, measures and/or generates data indicative of events A and events B. In this regard, the subsystem P 1204 may detect, measure and/or generate, for example, data indicative of temperature, speed, velocity, acceleration, a camera trigger, etc. Each event is time stamped with a time obtained from clock P 1201.

Also, during operation of system 1200, subsystem Q 1205 detects, measures and/or generates events C and events B'. In this regard, the subsystem Q 1205 detects, measures and/or generates, for example, data indicative of temperature, speed, velocity, acceleration, a camera trigger, etc. These events are time stamped with a time obtained from clock Q 1202.

Because clock P 1201 and clock Q 1202 run independently and keep separate and distinct times, a time stamp of an event associated with subsystem P 1204 and a time stamp of an event associated with subsystem Q 1205 are unrelated. In this regard, a time stamp associated with an event in events B is unrelated to a time stamp associated with an event in events B'.

Note, however, there is a relationship between events B in subsystem P 1204 and events B' in subsystem Q 1205. In this regard, the events B and B' may be the same type of events or events B may represent some type of data that when manipulated results in events B'. For example, events B may represent the speed in the X-direction of the system 1200 sampled at some frequency, $f_p$. Events B' may represent the speed in the x-direction of the system 1200 sampled at a different frequency, $f_c$.

Note that the subsystem P 1204 is not coupled in any manner with subsystem Q 1205. In this regard, there is no method that could be used to directly synchronize the events B and B'. For example, the subsystem P 1204 does not share a master clock with subsystem Q 1205. However, subsystem P 1204 and subsystem Q 1205 do share some common dynamic events, such as, for example, acceleration, velocity, etc. The common factors can be any time-varying event that is commonly detected and/or generated directly or indirectly by subsystem P 1204 and subsystem Q 1205. For example, the common event may be temperature as a function of time, barometric pressure as a function of time, or ambient daylight as a function of time.

Because the subsystem P 1204 and subsystem Q 1205 share common or related events, the matching logic 1203 correlates the data indicative of the common events as recorded by subsystem P 1204 and the data indicative of the common events as recorded by subsystem Q 1205.

Note that for purposes of the present disclosure the term correlate, correlates, correlated or correlation refer to a specific mathematic algorithm. In the correlation algorithm, there are two time-sampled sequences of data, e.g., the data indicative of the common events as recorded by subsystem P 1204 and the data indicative of the common events as recorded by subsystem Q 1205. The data indicative of the common events as recorded by subsystem P 1204 and the data indicative of the common events as recorded by subsystem Q 1205 each comprise a plurality of values, wherein each value represents data sampled at a frequency. Note that the frequency at which the data is sampled may differ between subsystem P 1204 and subsystem Q 1205.

In an exemplary embodiment, the data indicative of the common events as recorded by subsystem P 1204 and the data indicative of the common events as recorded by subsystem Q 1205 are correlated. The samples are multiplied, and the resulting products are summed. In correlation, the temporal shift value is determined, which is the difference in time between the data indicative of the common events as recorded by subsystem P 1204 and the data indicative of the common events as recorded by subsystem Q 1205.

When the matching logic 1203 correlates the common events of subsystem P 1204 with the common events of subsystem Q 1205, the matching logic 1203 determines a value indicative of a temporal shift between when the B events occurred and when the B' events occurred. Thus, the temporal shift value between the subsystem P 1204 and the subsystem Q 1205 allows the matching logic 1203 to match events B to events B' in time. This may be accomplished, for example, by adding or subtracting the value of the temporal shift to the time stamps of event B' or adding or subtracting the value of the time shift to the time stamps of event B.

Note that only two subsystems are described, i.e., subsystem P 1204 and subsystem Q 1205; however, the matching logic 1203 can determine a temporal shift between a plurality of subsystems running disparate clocks provided there is a common event being measured over a time by the different subsystems.

Further note that the common event that varies over time that is used for synchronization of events does not necessarily have to be directly observable. In this regard, the B events may indicate one parameter, and the B' events may indicate a different parameter. However, the B events may be related in some way to the B' events, such that one may be derived from the other. For example, the B events may indicate acceleration, whereas the B' events may indicate velocity. In such an example, the matching logic 1203 may calculate a common event between the subsystem P 1204 and the subsystem Q 1205 by either differentiating the B' events indicating velocity to obtain data indicative of acceleration or integrating the B events to obtain data indicative of velocity. Once the events are in comparable form, the matching logic 1203 may then perform the correlation to obtain a temporal shift value to match the B events to the B' events.

Figure 2:
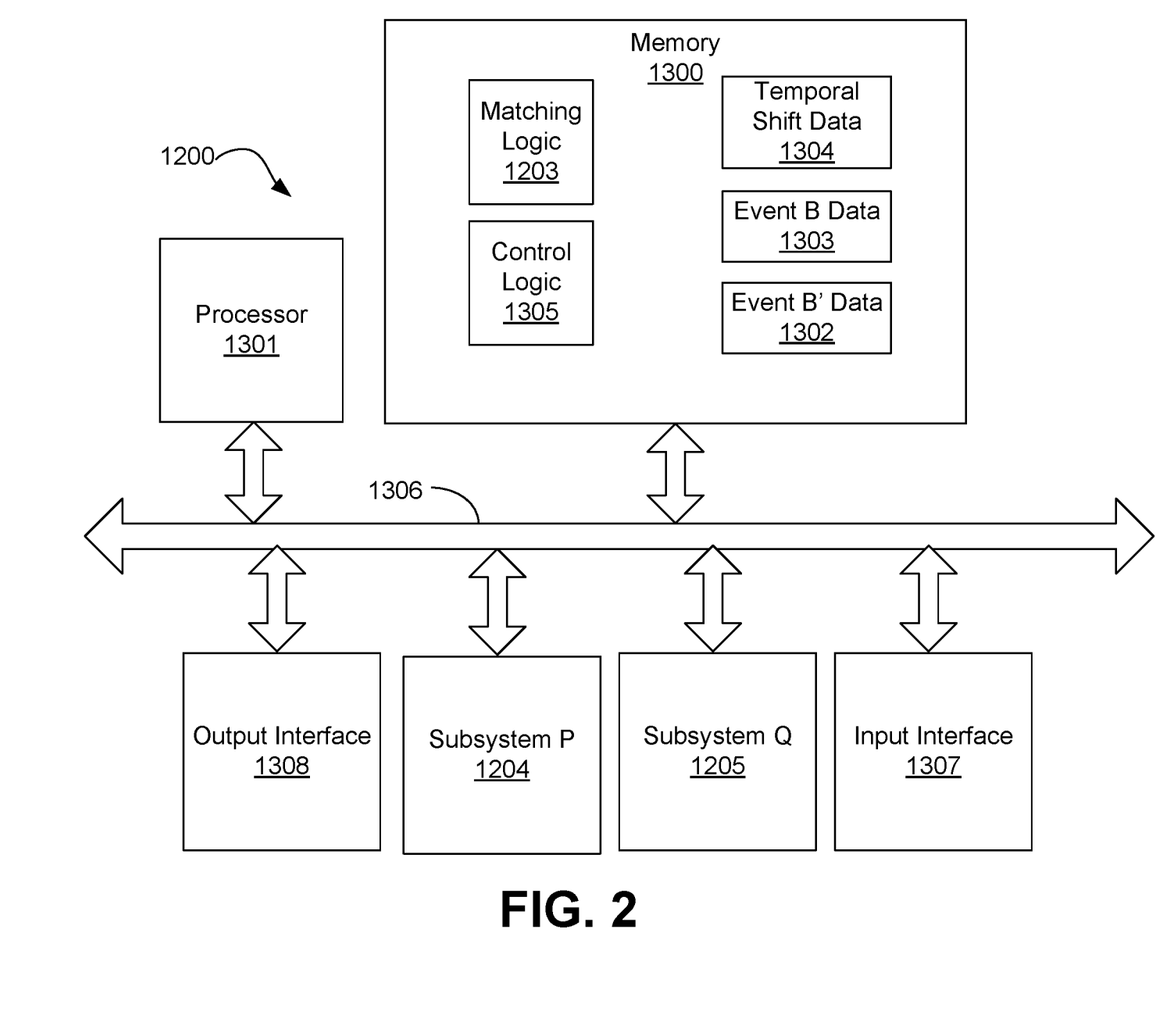
FIG. 2 is a block diagram of the components of the system shown in FIG. 1.

FIG. 2 is a block diagram of an exemplary system 1200 in accordance with an embodiment of the present disclosure. As shown by FIG. 2, the system 1200 comprises a processor 1301, the subsystem P 1204, the subsystem Q 1205, and memory 1300. Stored in memory 1300 is control logic 1305 and matching logic 1203.

The control logic 1305 controls the functionality of the system 1200. The matching logic 1203 controls temporally matching event B data 1303 with event B' data 1302, both stored in memory 1300, during operation. In this regard, the matching logic 1203 determines temporal shift data 1304 so that event B data 1303 may be aligned in time with event B' data 1302.

The system 1200 may further comprise an input device 1307 and an output device 1308. The input device 1307 may be, for example, a keyboard or a touch screen. The output device 1308 may be for example a display device or a printer.

The exemplary embodiment of the system 1200 depicted by FIG. 2 comprises at least one conventional processor 1301, such as a Digital Signal Processor (DSP) or a Central Processing Unit (CPU), that communicates to and drives the other elements within the system 1200 via a local interface 1306, which can include at least one bus. Further, the processor 1301 is configured to execute instructions of software, such as the control logic 1305 and the matching logic 1203.

It should be noted that the control logic 1305 and the matching logic 1203 can be implemented in software, hardware, firmware or any combination thereof. In an exemplary embodiment illustrated in FIG. 2, the control logic 1305 and the matching logic 1203 are implemented in software and stored in memory 1300.

Note that the control logic 1305 and the matching logic 1203, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

During operation, the subsystem P 1204 is configured, for example via a sensor, to measure or detect an event related to the system 1200. Upon detection or measurement, the control logic 1305 stores the data detected or measured as event B data 1303 and stores data indicative of a time obtained from the clock P 1201 (FIG. 1) of subsystem P 1204 at which the event was measured or detected.

During operation, the subsystem Q 1205 is configured, for example via a sensor, to measure or detect an event related to the system 1200. Upon detection or measurement, the control logic 1305 stores as event B' data 1302 data indicative of the parameter measured or detected, and stores data indicative of a time obtained from clock Q 1202 (FIG. 1) of subsystem Q 1205 at which the parameter was measured or detected.

To temporally match the event B data 1303 and the event B' data 1302, a user may elect to run the matching logic 1203 via the input interface 1307. When activated, the matching logic 1203 correlates the event B data 1303 and the event B' data 1302 to obtain value indicative of a temporal shift between the time of occurrence of the event B data 1303 and the event B' data 1302. The data indicative of the temporal shift may be stored locally as temporal shift data 1304.

Once the matching logic 1203 has correlated event B data 1303 with event B' data 1302, the matching logic 1203 then adds or subtracts the value indicative of the temporal shift from either the event B data 1303 or the event B' data 1302. The matching logic 1203 then outputs data to the output device 1308. Such data may be, for example, a listing of events from event B data 1303 associated temporally with a listing of events from event B' data 1302.

Figure 3:
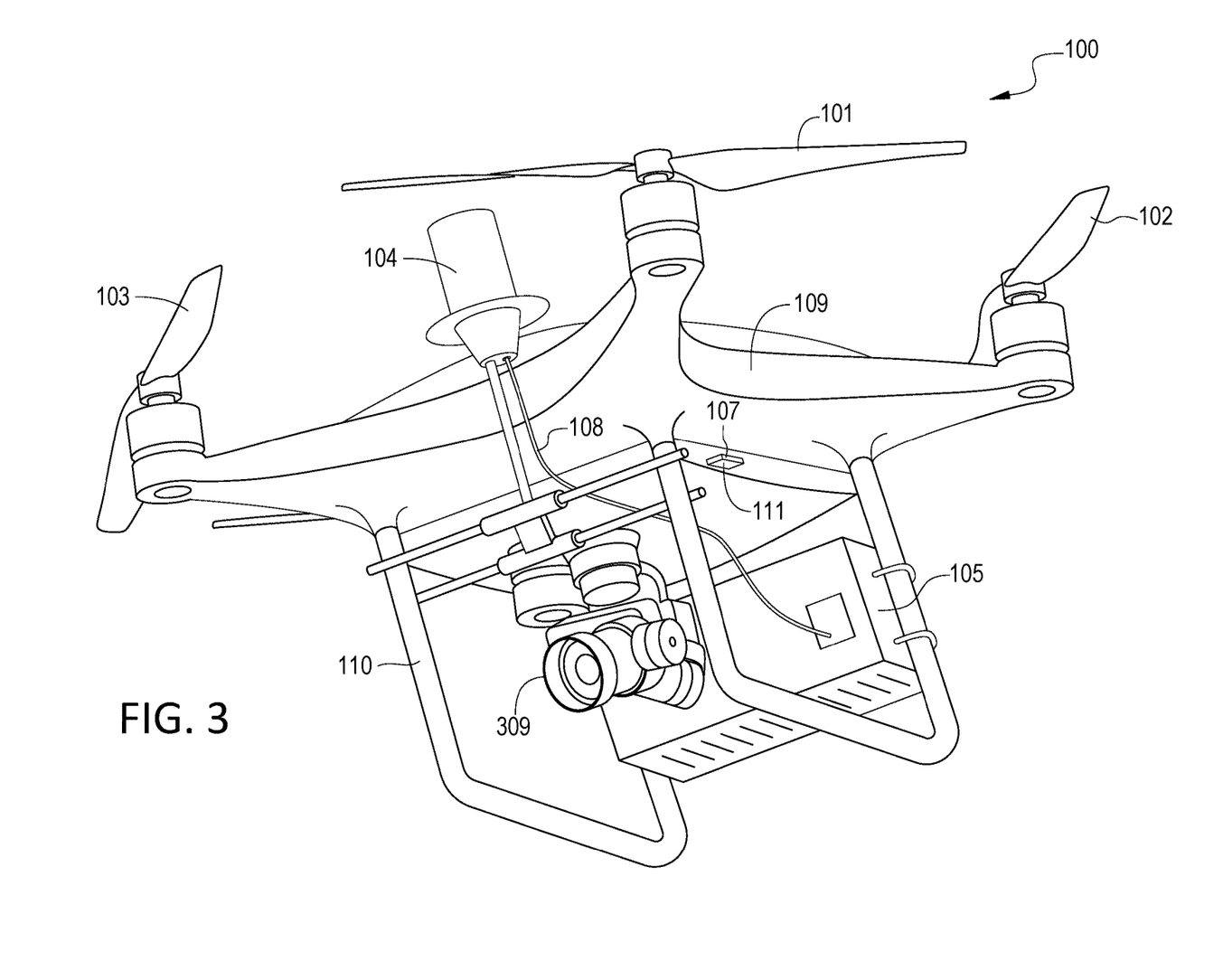
FIG. 3 is a perspective view of a drone in accordance with an embodiment of the present disclosure.

FIG. 3 is an exemplary drone 100 in accordance with an embodiment of the present disclosure. The drone 100 is shown for exemplary purposes and other moveable or stationary platforms may be used in other embodiments.

The exemplary drone 100 comprises a plurality of propellers 101-103 that move the drone through a trajectory path. Note that only three propellers 101-103 are shown but fewer or more propellers may be used in other embodiments of the present disclosure. While the figure depicts a rotary wing drone, any other drone embodiment such as a fixed wing, "V" wing and so forth could be employed.

The exemplary drone 100 comprises a body 109 to which the propellers 101-103 are coupled. Further coupled to the drone 100 is a frame 110. Coupled to the frame 110 are a camera 309, an antenna 104, and a direct geopositioning system (DPS) housing 105. Other implements may be attached to the drone frame 110 in other embodiments.

The drone camera 309 is any type of camera known in the art or future-developed for mounting on the drone frame 110 and taking photographs. As the drone 100 moves through the trajectory path, the camera 309 is instructed to take photographs at certain times or certain intervals, e.g., every few meters or every few seconds, from a control processor, which is described further herein.

The camera 309 is coupled to a secure digital (SD) port 107 that houses an SD card 111. In this regard, the SD card 111 comprises SD card circuitry for receiving and storing photographs obtained by the camera 309. In operation, the control processor of the drone 100 transmits a signal to the camera 309. In response to the signal received, the camera 309 takes a photograph, and data indicative of the photograph taken is stored on the SD card 111.

The antenna 104 is communicatively coupled to the DPS housing 105. During operation, a global navigation satellite system receiver (GNSS) in the DPS housing 105 captures data indicative of a location of the drone 100, and the GNSS calculates x, y, and z locations of the drone 100. Further, the GNSS time stamps each calculation of the x, y, and z locations with a local clock.

Figure 4:
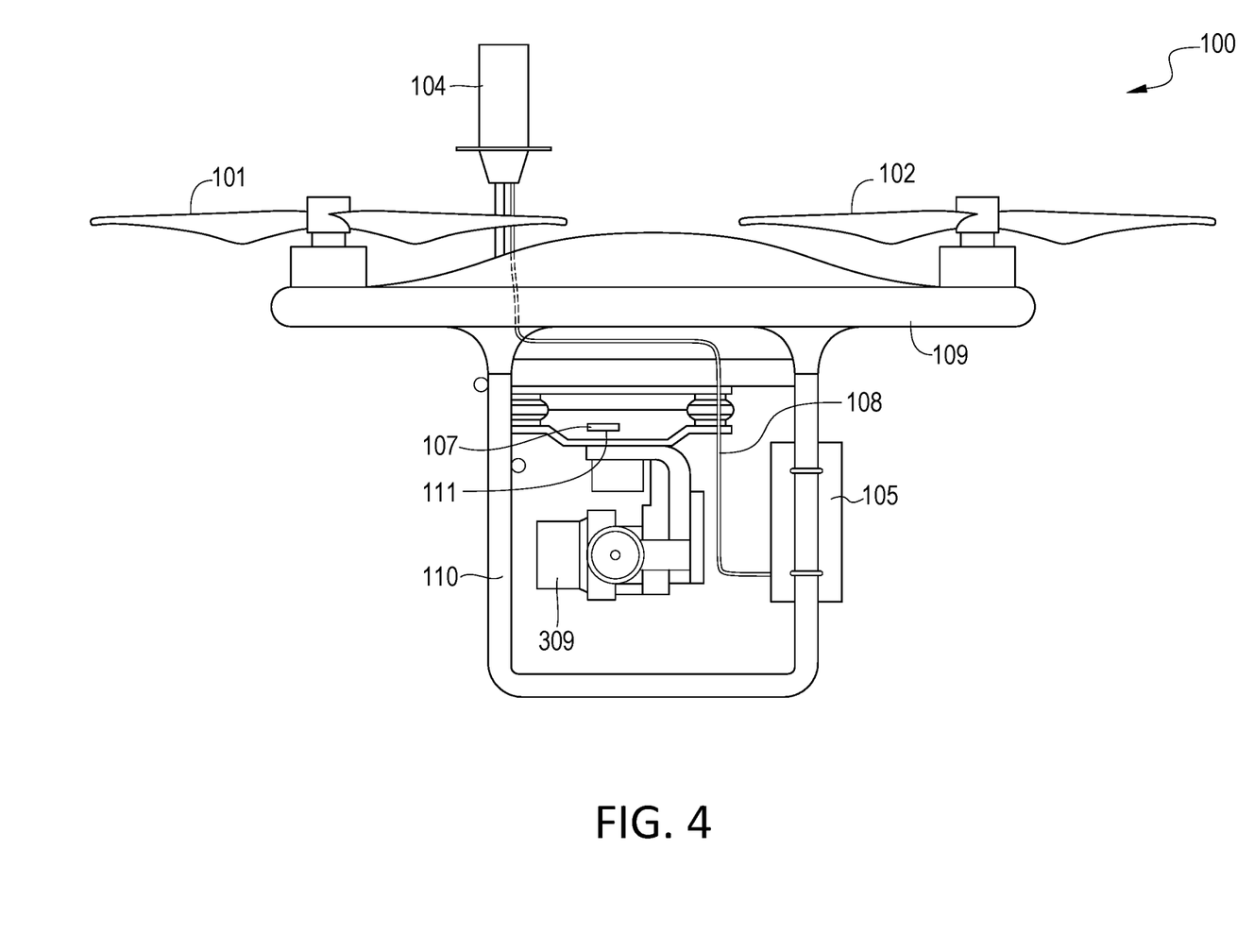
FIG. 4 is a side view of the drone such as is depicted in FIG. 3.

FIG. 4 is a side view of the drone 100 in accordance with an embodiment of the present disclosure. The side view shows the propellers 101 and 102 that are coupled to the body 109. Additionally, the side view depicts the camera 309, the DPS box 105, and the antenna 104 all coupled to the frame 110. Note that the antenna 104 is communicatively coupled to the DPS box 105 via the cable 108.

Figure 5:
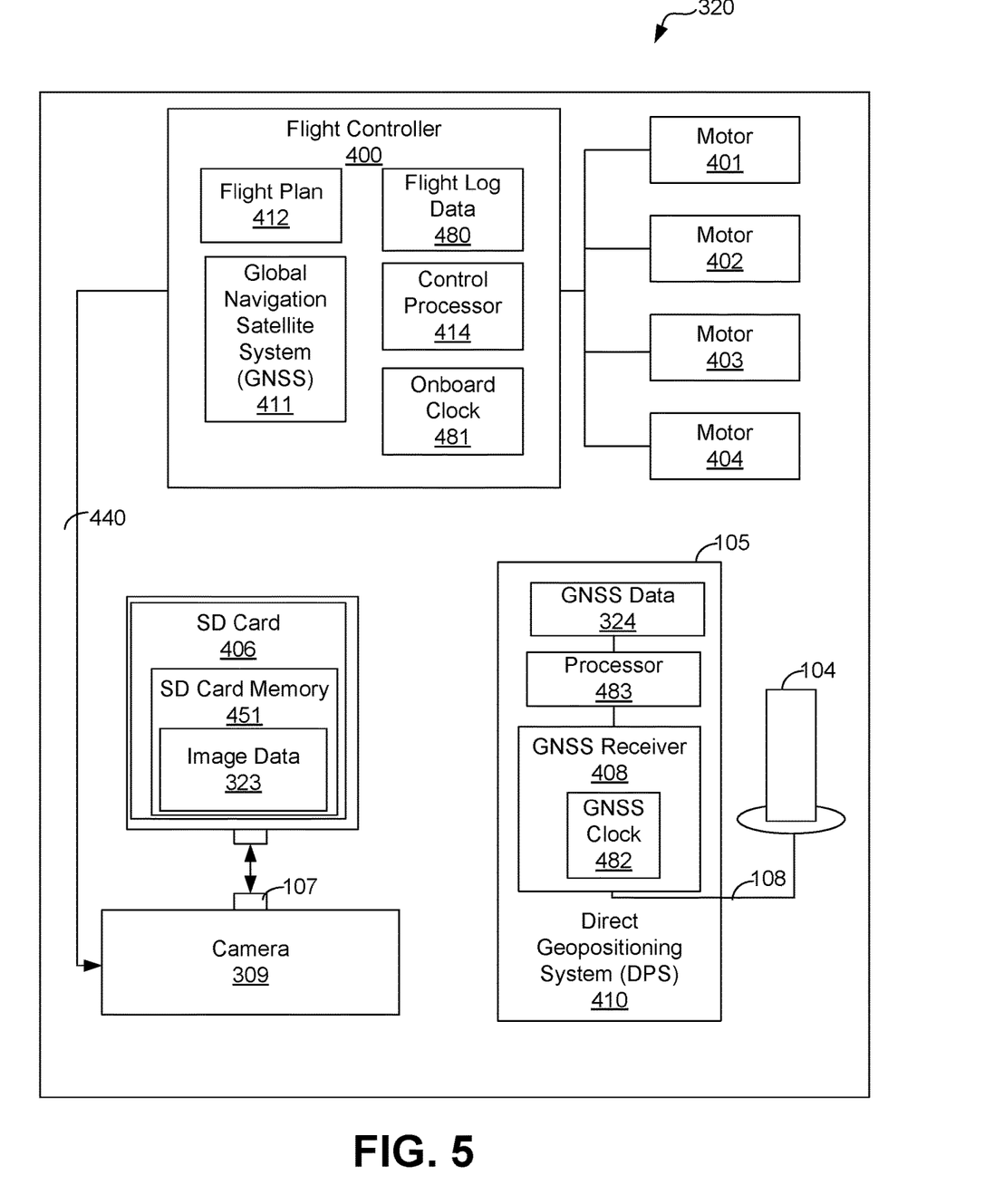
FIG. 5 is a block diagram of the drone such as is depicted in FIGS. 3 and 4.

FIG. 5 is a block diagram illustrating an exemplary drone system 320 implemented in the drone 100 (FIG. 1) in accordance with an embodiment of the present disclosure.

The drone system 320 comprises a flight controller 400. The flight controller 400 comprises a global navigation satellite system 411, flight plan data 412, and a control processor 414. Additionally, the flight controller 400 comprises flight log data 480.

Among other operations, the control processor 414 operates one or more motors 401-404 that activate propellers 101-103 (FIG. 3) to fly the drone 100. Notably, the control processor 412, in accordance with the flight plan data 412, directs the propellers to move along the trajectory defined in the flight plan data 412. In this regard, the global navigation satellite system (GNSS) 411 aids in directing the drone along the identified flight plan data 412 by monitoring the latitude, longitude, and elevation of the drone 100 as the drone 100 moves in accordance with the flight plan data 412.

As indicated, the control processor 414 directs the drone 100 via the flight plan data 412 that is loaded onto the flight controller 400 to fly to a given latitude, longitude, and elevation. During movement of the drone 100 to the directed latitude, longitude, and elevation, the control processor 414 periodically transmits a signal to the camera 309 via connection 440 signaling the camera 309 to take a photograph of a target also in accordance with the loaded flight plan data 412. Note that the connection 440 may be, for example, a cable. As a mere example, the flight plan 412 may direct the camera to take a photograph when traveling from point A to point B. In other examples, the flight plan 412 may direct the camera to take a picture every two seconds or every two meters along the trajectory of the drone 100.

The system 320 further comprises a SD card 111. When the camera 309 receives a signal to take a photograph, the camera 309 captures an image. Further, the camera 309 stores data indicative of the images taken to image data 323 stored in SD card memory 451 on the SD card 406. Further, each image stored is correlated in the image data 323 with a time stamp based upon the onboard clock 481.

During operation, the processor 414 records data related to the flight of the drone 100 (FIG. 3) as flight log data 480. The flight log data 480 comprises events related to the flight, for example, the speed or velocity of the drone 100 or when an image is captured by the camera 309. Each of these events is stored as flight log data 480 with a corresponding time stamp obtained from the onboard clock 481.

The system 320 further comprises the DPS housing 105 that houses a GNSS receiver 408 and a processor 483. The GNSS receiver 408 is coupled to the antenna 104 via a connection 108 and to the processor 483.

In operation, the GNSS receiver 408 receives data indicative of locations of the drone 100 as the drone 100 travels the flight plan 412. The GNSS receiver 408 calculates an x, y, and z location from the data received from the antenna 104. Further, the GNSS receiver 408 tags each location calculated with a time stamp based on a time received from a GNSS clock 482. The GNSS receiver 408 transmits the data indicative of locations and corresponding time stamps to the processor 483. The processor 483 receives the data indicative of locations of the drone 100 and the corresponding time stamps and saves the data as GNSS data 324.

Note that the onboard clock 481 and the GNSS clock 482 are not synchronized. In this regard, there is no relation to the time stamps provided in the flight log data 480 and the time stamps provided in the GNSS data 324. Thus, the events indicated in the flight log data 480 and the events indicated in the GNSS data 324 are not synchronized.

Figure 6:
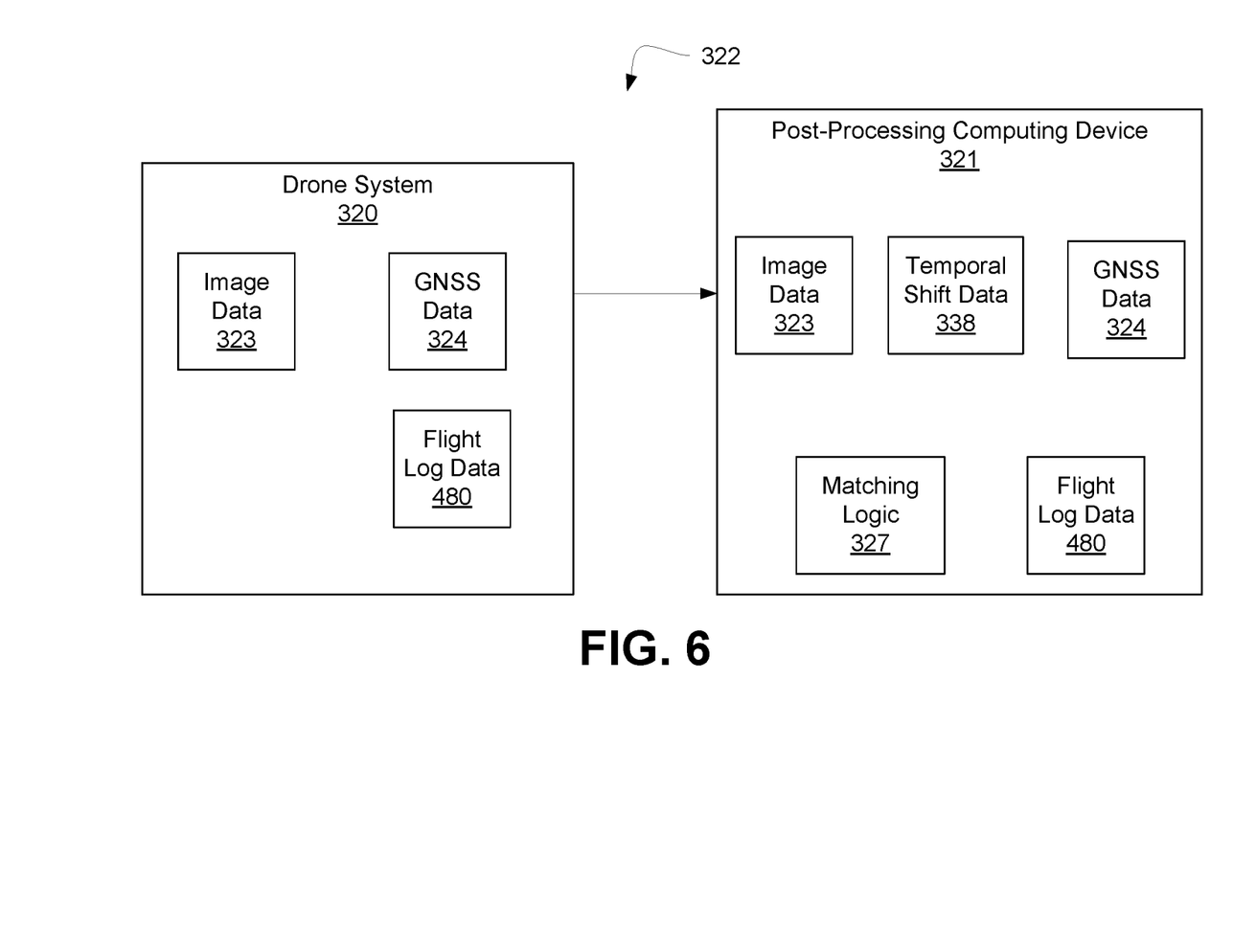
FIG. 6 is a block diagram of a processing system in accordance with an embodiment of the present disclosure.

FIG. 6 is an exemplary processing system 322 illustrating an example of the present disclosure. The processing system 322 comprises the drone system 320 of the drone 100 and a post-processing computing device 321. In operation, the drone system 320 periodically captures image data 323 via the camera 309 (FIG. 2) that is written to the SD card 111 (FIG. 2). Each image in the image data 323 is time stamped based upon a time obtained from the onboard clock 481 (FIG. 5).

Additionally, the drone system 320 periodically captures flight log data 480 sampled at a predetermined frequency, and the data captured is also time stamped based upon the onboard clock 481. As the drone system 320 captures data indicative of the drone flight, the drone system 320 saves to the flight log data 480 data indicative of the drone flight detected and/or measured. Each data entry in the flight log data 480 is time stamped with a time obtained from the onboard clock 481. In one example, the flight log data 480 may comprise data indicative of the velocity of the drone 100 in the x, y, and z directions correlated with a time that the data was sampled obtained from the onboard clock 481.

In another example, the drone system 320 may periodically transmit a signal to the camera 309 (FIG. 3) to direct the camera 309 to take a picture. The drone system 320 further stores in the flight log data 480 data indicative of the time, according to the onboard clock 481, when the camera acquired the picture.

Further, the GNSS receiver 408 (FIG. 5) contained within the DPS box 105 (FIG. 5) periodically samples data indicative of a location of the drone system 320 received by the antenna 104, which is stored as GNSS data 324. The GNSS data 324 may comprise data indicative of the x, y, and z location of the drone 100 at the time of sampling and the x, y, and z data is correlated with a timestamp according to the GNSS clock 482. Further, the GNSS receiver 408 may be configured for computing velocities of the drone 100 using either differencing in the GNSS data 324 or using onboard accelerometers (not shown).

In the example provided, the flight log data 480 comprises data indicative of the speed of the drone 100 wherein each sample is tagged with a time obtained from the onboard clock 481. Further, the flight log data 480 comprises data indicative of camera events also tagged with a time from the onboard clock 481. Additionally, the GNSS data 324 comprises data indicative of the velocities of the drone 100 tagged with a time obtained from the GNSS clock 482.

Note that the events of the flight log data 480 and the events of the GNSS data 324 were obtained and tagged using separate and distinct clocks. Thus, to synchronize events occurring between the flight controller 400 and the DPS 410 or determine when an image was captured, a temporal shift value is calculated and used to synchronize the events, as described herein.

Figure 7:
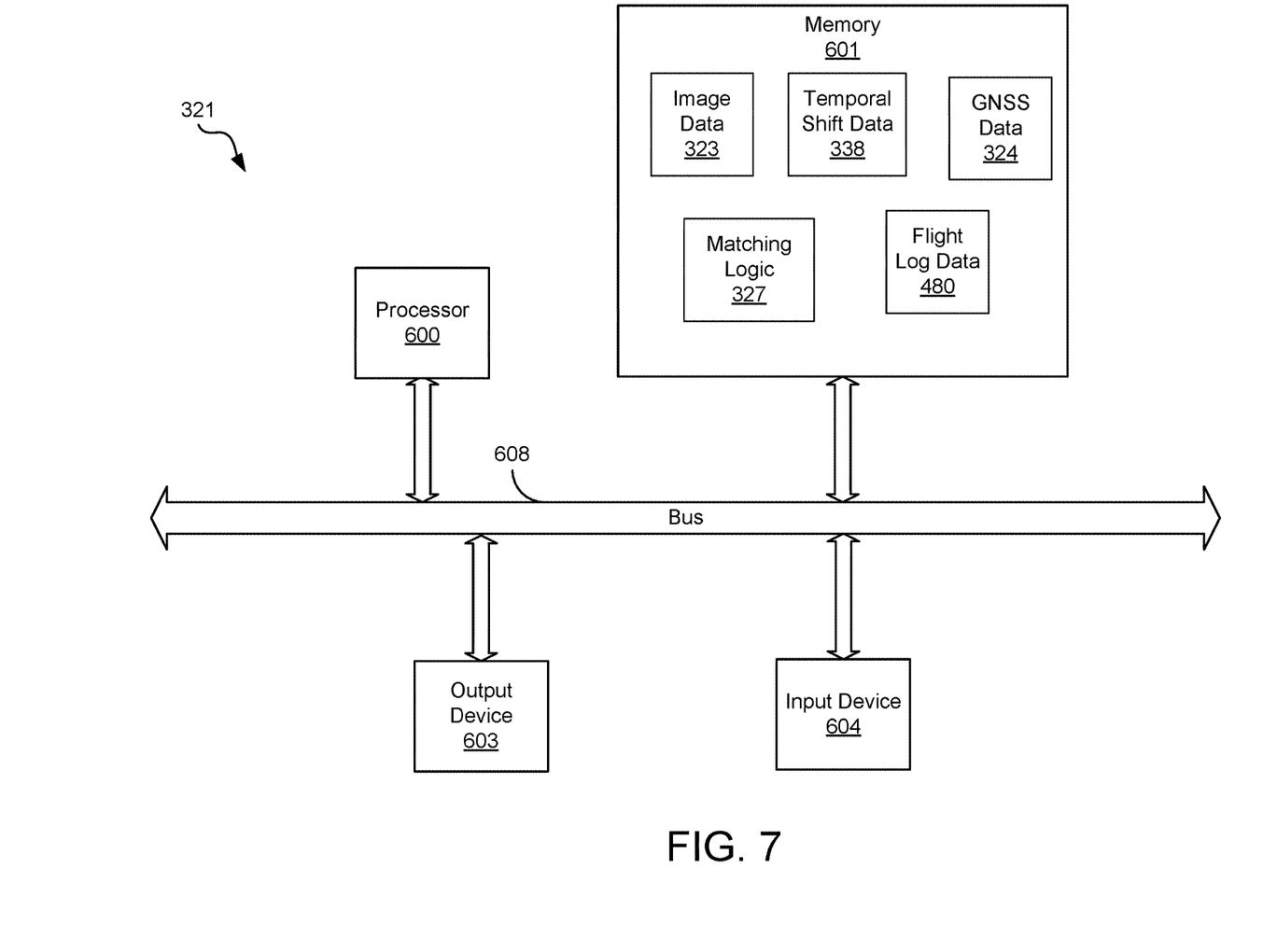
FIG. 7 is a block diagram of a post-processing computing device such as is depicted in FIG. 6.

FIG. 7 is a block diagram of an exemplary post processing computing device 321 in accordance with an embodiment of the present disclosure. As shown by FIG. 7, the exemplary post processing computing device 321 comprises a processor 600, an output device 603, and an input device 604. Further, the post processing computing device 321 comprises memory 601. Stored in memory 601 is matching logic 327.

The matching logic 327 generally controls the functionality of the post processing computing device 321, as will be described in more detail hereafter. It should be noted that the matching logic 327 can be implemented in software, hardware, firmware or any combination thereof. In an exemplary embodiment illustrated in FIG. 7, the matching logic 327 is implemented in software and stored in memory 601.

Note that the matching logic 327, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the post processing computing device 321 depicted by FIG. 7 comprises the at least one conventional processor 600, such as a Digital Signal Processor (DSP) or a Central Processing Unit (CPU), that communicates to and drives the other elements within the post processing computing device 321 via a local interface 608, which can include at least one bus. Further, the processor 600 is configured to execute instructions of software, such as the matching logic 327.

The input device 604 is any device for receiving input from a user. For example, the input device may be a mouse, a keyboard, a touchscreen or the like. In one embodiment, the user may initiate execution of the matching logic 327 via the input device 604.

The output device 603 is any device that outputs information to a user. For example, the output device 603 may be a display device or a printer. In one embodiment, the results of the matching logic 327 may be provided to the user via the output device 603.

The post processing computing device 321 further comprises the image data 323, the GNSS data 324, and the flight log data 480 stored in memory 601. The image data 323 is data indicative of a plurality of images and associated with each image is a time stamp obtained from the onboard clock 481 (FIG. 5).

Further, the flight log data 480 is data indicative of events, measurements made, or data generated related to flight of the drone 100 (FIG. 3). Note that one such event is a camera trigger event, which is when an image is acquired by the camera 309, and each camera trigger event is time-stamped based on the onboard clock 481. Another event recorded in the flight log data 480 may be x, y, and z velocities of the drone 100. Each entry in the flight log data 480 is associated with a time stamp obtained from the onboard clock 481.

The GNSS data 324 is data indicative of a plurality of locations obtained during flight of the drone 100, and each of the plurality of locations is associated with a time stamp obtained from the GNSS clock 482 (FIG. 5). Therefore, each image in the image data 323 and the events contained in the flight log data 480 are not temporally in sync with the events contained in the GNSS data 324.

In operation, a user (not shown) may elect to run the matching logic 327 to obtain a value indicative of a temporal shift between the flight log data 480 and the GNSS data 324. To determine the value indicative of the temporal shift, the matching logic 327 correlates the flight log data 480 with the GNSS data 324. This is explained further with reference to FIG. 8.

In one embodiment, the events in the flight log data 480 may not be the same type of events in the GNSS data 324. In such an embodiment, the matching logic 327 performs an operation on one set or both sets of the data to translate the data into like events.

As a mere example, the flight log data 480 may be data indicative of velocities of the drone 100 in the x, y, and z direction. In such an example, the matching logic 327 may calculate the varying speeds of the drone over time by calculating a magnitude of the velocity vector for each of the velocity events in the x, y, and z direction.

Further, the GNSS data 324 may be data indicative of the x, y, and z location of the drone 100 over time. Note that the processor 483 may calculate velocities from the x, y, and z location using either differencing in position or by onboard accelerometers (not shown). In such an example, the matching logic 327 can calculate the varying speeds of the drone 100 by adding the individual velocities in quadrature and taking the square root of the sum, which is the magnitude of the composite velocity vector. After such operations, the translated flight log data 480 and the GNSS data 324 comprise like events that may be correlated.

Once the flight log data 480 and the GNSS data 324 are translated to represent the same type of events, e.g., speed, the matching logic 327 correlates the flight log data 480 and the GNSS data 324 to obtain temporal shift data 338. This temporal shift data 338 represents a value indicative of the offset in time between the events in the flight log data 480 and the GNSS data 324.

The matching logic 327 then transpose GNSS locations events to camera trigger events using the temporal shift data. For example, the positions of the drone 100 when the images were obtained. Note that as described the flight log data 480 comprises data indicative of camera trigger events based on the onboard clock 481. Thus, by applying the temporal shift to time of the camera trigger event, the matching logic 327 ties the camera acquisition events to the GNSS locations of the drone 100 when each image in the image data 323 was acquired.

Figure 8:
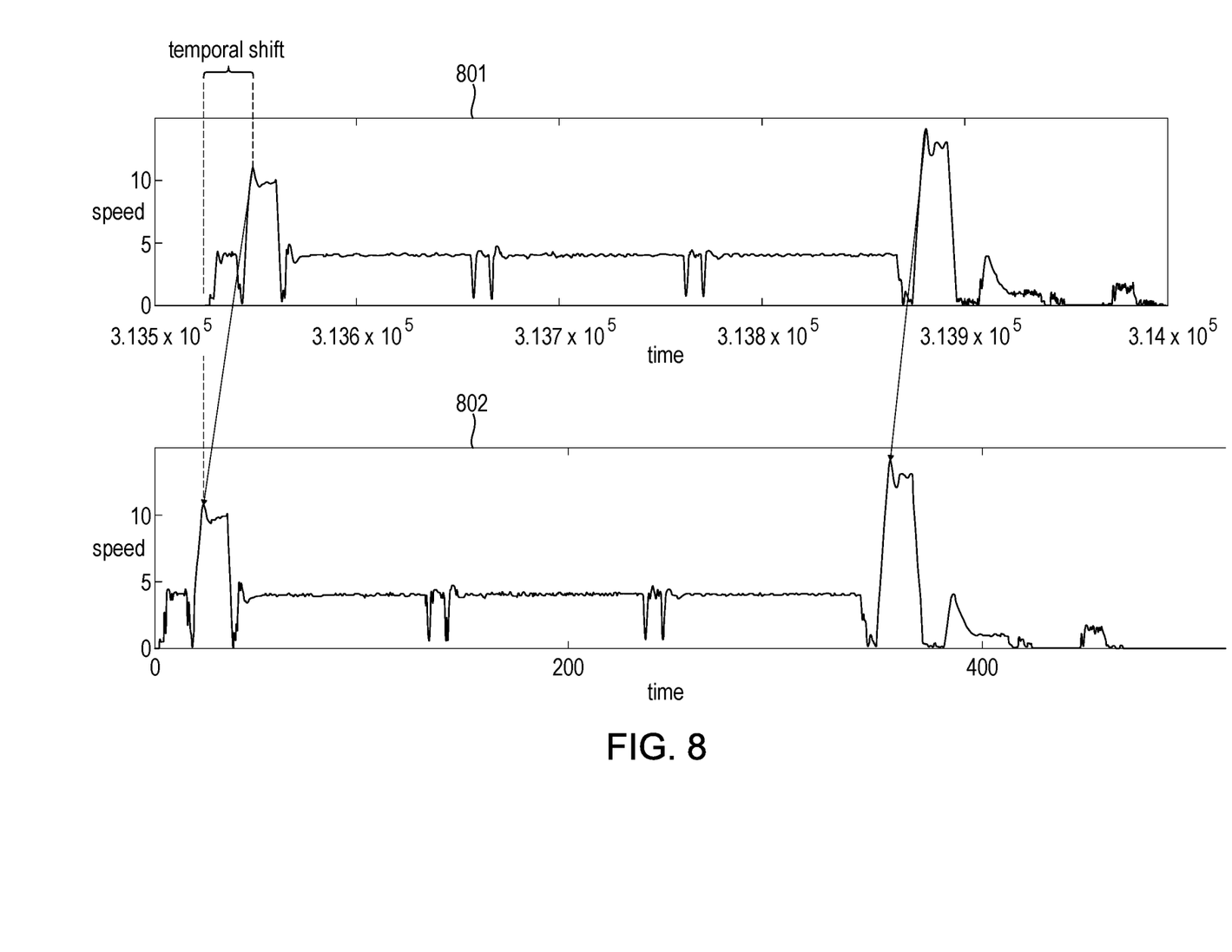
FIG. 8 depicts two graphs showing a temporal shift in accordance with an embodiment of the present disclosure.

This is further illustrated in FIG. 8. Graph 801 represents the speed of the drone 100 (FIG. 3) over time calculated from the GNSS data 324. Graph 802 represents the speed of the drone 100 over time calculated from the flight log data 480. Note that the graphs are identical but misaligned by a value indicative of a temporal shift. The value of the temporal shift shown is found in correlation of graph 801 and 802. This temporal shift value may be used to transpose camera trigger events to GNSS locations.

Note that in the example provided, there are two subsystems, the flight controller 400 and the DPS 410, and each subsystem has a local clock, onboard clock 481 and GNSS clock 482, respectively. The onboard clock 481 and the GNSS clock 482 are not synchronized. The matching logic 327 determines or calculates temporally dependent events of the flight controller 400 and the DPS 410. The matching logic 327 correlates these common events to determine a temporal shift between the onboard clock 481 and the GNSS clock 482. The matching logic 327 then matches time of events based upon the temporal shift in the flight log data 480 and/or the GNSS data 324 such that the events are synchronized. Further, the matching logic 327 also determines an x, y, and z location of the drone 100 at the time of the acquisition of images in the image data 323 based upon the temporal shift calculated.

Figure 9:
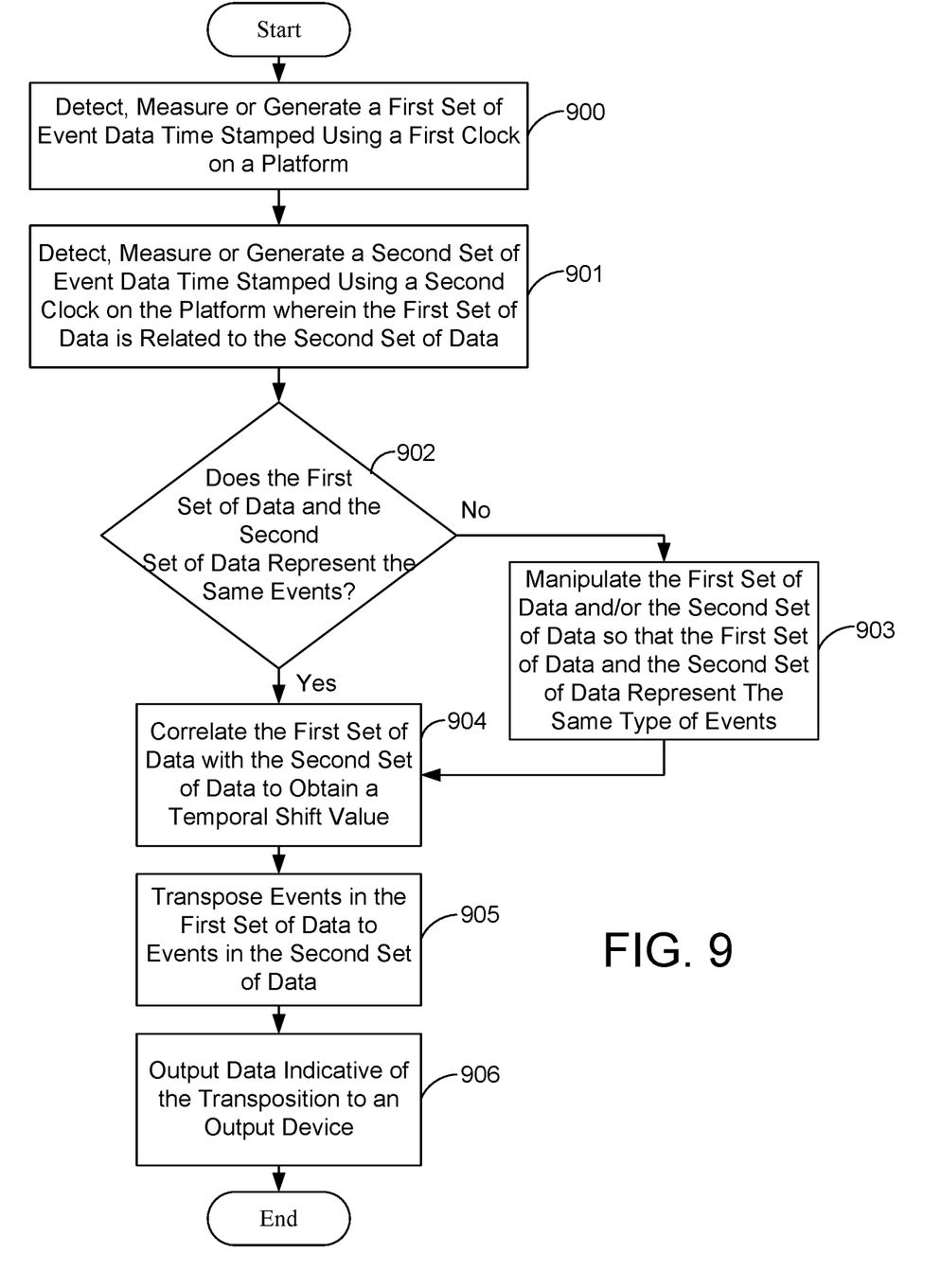
FIG. 9 is a flowchart of exemplary architecture and functionality of the system such as is depicted in FIG. 6.

FIG. 9 is a flowchart depicting exemplary functionality and architecture of the system 1200.

In step 900, the system 1200 (FIG. 1) detects, measures or generates a first set of event data. Each event in the event data is time-stamped using a first clock on a platform. Per the example used with reference to FIG. 7, the flight controller 400 (FIG. 5) detects velocities of the drone 100 in the x, y, and z direction and stores the detected velocities in the flight log data 480. These events are time-stamped based upon the onboard clock 481 (FIG. 5).

In step 901, the system 1200 detects, measures or generates a second set of event data. Each event in the event data is time-stamped using a second clock on the platform. Per the example used with reference to FIG. 7, the DPS 410 (FIG. 5) detects velocities of the drone 100. These events are time-stamped based upon the GNSS clock 482.

If the first set of data and the second set of data represent the same type of events in step 902, the system 1200 correlates the first set of data with the second set of data to obtain a temporal shift value in step 904, as shown in FIG. 8. In step 905, the system 1200 transposes events in the first set of data to events in the second set of data using the temporal shift value calculated. In step 906, the system 1200 outputs data indicative of the transposition to the output interface 1308.

If the first set of data and the second set of data do not represent the same type of events in step 902, the system 1200 manipulates the first set of data and/or the second set of data so that the first set of data and the second set of data represent the same type of events in step 903. In the example provided with reference to FIG. 7, the flight log data 480 is data indicative of velocities of the drone 100 in the x, y, and z direction. Further, the GNSS data 324 is data indicative of the velocities of the drone 100. In such an example, the flight log data 480 and the GNSS data 324 are translated into like events, e.g., speeds.

Once the first set of data and the second set of data are translated into like events, the system 1200 correlates the first set of data with the second set of data to obtain a temporal shift value in step 904. In step 905, the system 1200 transposes events in the first set of data to events in the second set of data using the temporal shift value calculated. In step 906, the system 1200 outputs data indicative of the transposition to the output interface 1308.

What we claim is:
1. A system for synchronizing events, comprising:
a first subsystem configured for detecting, measuring, or generating a first set of events, the first subsystem comprising a first clock for time-stamping each event detected, measured, or generated by the first subsystem;
a second subsystem configured for detecting, measuring, or generating a second set of events, the second subsystem comprising a second clock not synchronized to the first clock, the second clock for time-stamping events detected, measured, or generated by the second subsystem, wherein the first set of events is related to the second set of events; and a processor configured for correlating the first set of events with the second set of events to determine a value indicative of a temporal shift between a time of occurrence of the first set of events and a time of occurrence of the second set of events, the processor further configured for temporally matching the first set of events to the second set of events and outputting data indicative of the matching between the first set of events to the second set of events to an output device, if the data from the first subsystem does not represent the same events as the data from the second subsystem, the system may transform either the event data from the first subsystem, if the first set of events and the second set of events do not represent the same type of event, the processor transforms the first set of events, the second set of events, or both into the same event, the processor system then correlates the transformed event data from the first subsystem with the event data from the second subsystem to obtain a value indicative of a temporal shift, the value indicative of the temporal shift represents the time difference between the local clock of the first subsystem and the local clock of the second subsystem, the processor can temporally synchronize the event data of the first subsystem with the event data of the second subsystem based upon the value indicative of the temporal shift.

2. The system for synchronizing events of claim 1, wherein the first subsystem and the second subsystem are part of a stationary platform.

3. The system for synchronizing events of claim 1, wherein the first subsystem and the second subsystem are part of a dynamic platform.

4. The system for synchronizing events of claim 1, wherein the first set of events and the second set of events comprise data indicative of temperature, speed, velocity, acceleration, or a camera trigger event.

5. The system for synchronizing events of claim 1, wherein the first set of events and the second set of events comprise data that varies over time.

6. The system for synchronizing events of claim 5, wherein the first set of events and the second set of events comprise data indicative of temperature as a function of time, barometric pressure as a function of time, or ambient daylight as a function of time.

7. The system for synchronizing events of claim 1, further comprising more than two subsystems, wherein each subsystem operates according to a separate and disparate clock.

8. The system for synchronizing events of claim 7, wherein the processor is further configured for correlating a plurality of sets of events each set from the more than two subsystems to determine a temporal shift value for each of the more than two subsystems, the processor further configured for temporally matching events from each of the more than two subsystems and outputting data indicative of the matching to the output device.

9. The system for synchronizing events of claim 1, wherein the platform is a drone the first subsystem is a flight controller, and the second subsystem is a global navigation satellite system receiver (GNSS).

10. The system for synchronizing events of claim 9, wherein the flight controller operates based on an onboard clock and the flight controller is configured for recording data indicative of x, y, and z velocities time-stamped based on the onboard clock.

11. The system for synchronizing events of claim 10, wherein the flight controller is further configured for recording a camera trigger events time-stamped based on the onboard clock.

12. The system for synchronizing events of claim 11, wherein the GNSS operates based on a GNSS clock and the GNSS is configured for recording data indicative of x, y, and z locations of the drone during flight time-stamped based on the GNSS clock.

13. The system for synchronizing events of claim 12, wherein the processor is further configured for:
   calculating first speeds over time of the drone based on the z, y, and z velocities; and
   calculating second speeds over time of the drone based on the x, y, and z locations.

14. The system for synchronizing events of claim 13, wherein the processor is further configured for correlating the first speeds over time with the second speeds over time to determine a value indicative of a temporal shift between the first speeds and the second speeds.

15. The system for synchronizing events of claim 14, wherein the processor is further configured for transposing the camera trigger events to the x, y, and z locations of the drone.

* * * * *